No. 695,923. Patented Mar. 25, 1902.
W. FRANCIS.
SAFETY DEVICE FOR SHAFTING.
(Application filed Apr. 30, 1901.)
(No Model.)

WITNESSES:

INVENTOR:
William Francis
By Chas. F. Van Horn
Attorney

UNITED STATES PATENT OFFICE.

WILLIAM FRANCIS, OF PHILADELPHIA, PENNSYLVANIA.

SAFETY DEVICE FOR SHAFTING.

SPECIFICATION forming part of Letters Patent No. 695,923, dated March 25, 1902.

Application filed April 30, 1901. Serial No. 58,150. (No model.)

*To all whom it may concern:*

Be it known that I, WILLIAM FRANCIS, a citizen of the United States, residing at Philadelphia, in the county of Philadelphia and State of Pennsylvania, have invented new and useful Improvements in Safety Devices for Shafting, of which the following is a specification.

My invention relates to lines of shafting from which power is transmitted by belting to other lines of shafting or counter-shafts and where it is necessary or desirable at times to bring the driven lines of shafting to a state of rest. Generally the driving-belt is thrown off, and when power is needed is again put on. This is a dangerous practice, resulting at times in the breaking of different parts of the plant or in injury to the operator.

The object of my invention is to provide a dead or safety pulley which will allow not only the counter or driven shafts, but the belt as well, to come to a state of rest without destruction of the parts or injury to the operator. I attain these objects by the mechanism illustrated in the accompanying drawings, in which—

Figure 2:
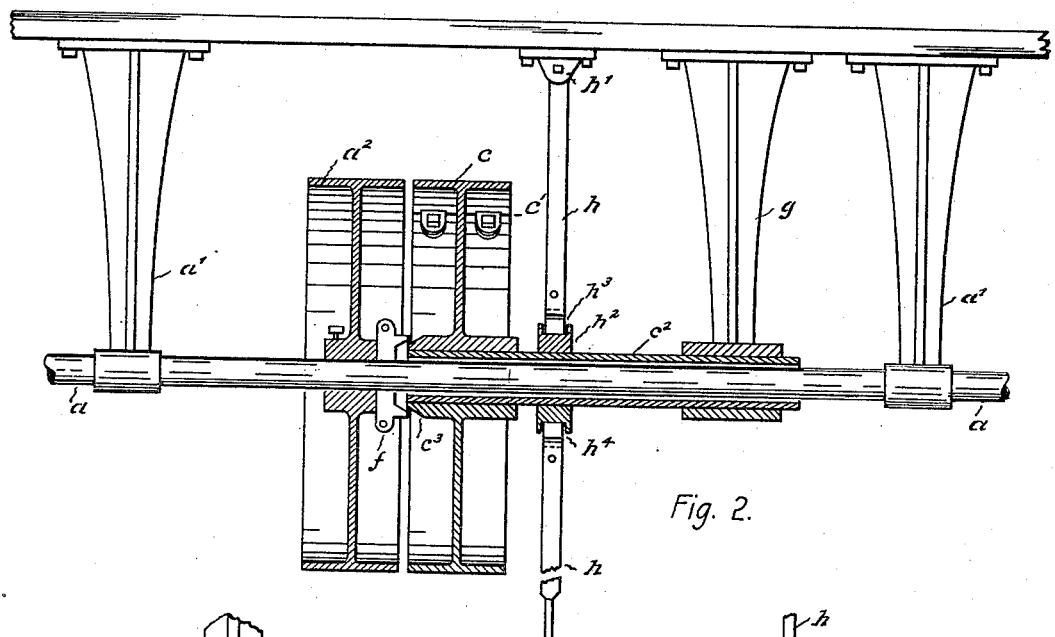
Figure 3:
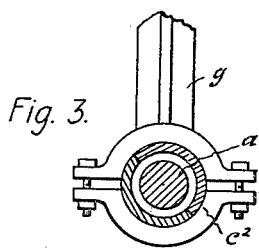
Figure 4:
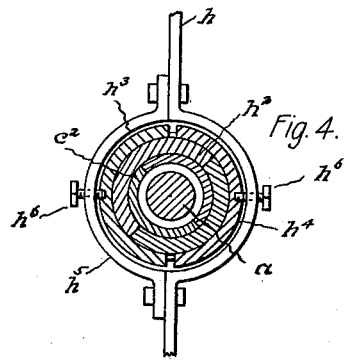
Figure 1:
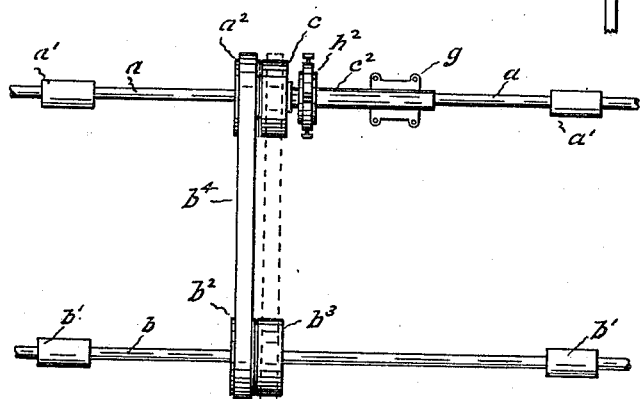

Figure 1 is a plan of a line of shafting and a counter or driven shaft driven by it. Fig. 2 is a side elevation, partly in section, of a main line of shafting equipped with a safety-pulley. Fig. 3 is an end view of the supporting-hanger for the safety-pulley with shaft in section. Fig. 4 is the shifting-lever in cross-section.

Similar letters refer to similar parts throughout the several views.

$a$ is the main driving-shaft, which is supported and runs in the hangers $a'$ and is provided with the driving-pulley $a^2$.

$b$, Fig. 1, is a counter or driven shaft which is supported and runs in the bearings $b'$ and is provided with the tight pulley $b^2$.

$b^3$ is a loose pulley.

$b^4$ is the belt.

$c$ is the dead or safety pulley, constructed in two parts and is what is known as a "split pulley," one parting being shown at $c'$, Fig. 2. The end $c^3$ of its hub is cone-shaped to fit into the recess of the collar $f$, which may be secured either to the pulley $a^2$ or to the shaft $a$. The pulley $c$ runs loosely upon the split hollow shaft $c^2$, which is clamped together and supported by the clamp-hanger $g$. The internal diameter of the split hollow shaft $c^2$ is greater than the diameter of the shaft $a$, which prevents friction. (See Fig. 3.) The shifting-lever $h$ is pivoted at $h'$ and is free to slide on the split shaft $c^2$. It consists of the grooved collar $h^2$, which, if desired, may be a part of the hub of pulley $c$, split rings $h^3$ $h^4$, fitting in the groove of the collar $h^2$, the frame $h^5$, and the engaging screws $h^6$ $h^6$. All of the parts are split to allow it to be put in position without disturbing the main shaft $a$; but it may be constructed without being split in cases where it is erected at the same time with the main line of shafting.

To shift the belt $b^4$ onto the pulley $c$ to stop the counter-shaft $b$, the lever $h$ is moved, bringing the grooved collar $h'$ against the hub of the pulley $c$, forcing the conical end of its hub into the recess in the collar $f$. The friction of the parts causes the pulley $c$ to revolve on the shaft $c^2$ in the same direction as the pulley $a^2$. With a pole, which is generally used for that purpose, the belt can then be readily shifted from the pulleys $a^2$ $b^2$ to $c$ $b^3$, as shown in dotted lines, Fig. 1. The lever $h$ is then moved away from the pulley $c$, which causes the friction of its hub with the collar $f$ to cease, and the pulley, counter-shaft, and belt come to rest. To return the belt to the pulleys $a^2$ $b^2$ to set the counter-shaft in motion, the lever $h$ is moved as before, the friction causing the pulley $c$ to revolve on the shaft $c^2$ and through the belt $b^4$ causing the counter-shaft $b$ to revolve, when the belt is easily shifted to the pulley $a^2$ $b^2$, and the lever $h$ being moved away from the pulley $c$ it comes to rest on the shaft $c^2$. It is clearly to be seen that the shifting is done without danger of breaking the machinery or injury to the operator.

It is obvious that it is essential to the operation that motion be first imparted to the pulley $c$. In Fig. 2 I have shown a friction-cone; but the same end may be accomplished in various ways.

What I claim as my invention, and desire to secure by Letters Patent, is—

1. The combination of the clamp-hanger $g$, shaft $a$, hollow shaft $c^2$, pulley $a^2$, the safety-pulley $c$, provided with the conical hub $c^3$ and the concaved collar $f$, secured to the shaft $a$, all of said parts, except the shaft $a$ and pulley $a^2$ being split, substantially as shown and described.

2. The combination of the clamp-hanger $g$, shaft $a$ hollow shaft $c^2$ shifting-lever $h$, pulley $a^2$ loose pulley $c$, and the collar $f$, secured to the shaft $a$, and concaved to receive the conical end $c^3$ of the hub of said pulley $c$, substantially as shown and described.

In testimony whereof I affix my signature in presence of two witnesses.

WILLIAM FRANCIS.

Witnesses:
HERVEY J. SHERER,
HEPNER P. VAN HORN.